US010788681B2

United States Patent
Lee et al.

(10) Patent No.: US 10,788,681 B2
(45) Date of Patent: Sep. 29, 2020

(54) BACKLIGHT UNIT FOR 3D IMAGE DISPLAY AND METHOD OF MANUFACTURING THE BACKLIGHT UNIT

(71) Applicant: SAMSUNG ELECTRONICS CO., LTD., Suwon-si (KR)

(72) Inventors: Sunghoon Lee, Seoul (KR); Dongouk Kim, Pyeongtaek-si (KR); Joonyong Park, Suwon-si (KR); Jihyun Bae, Seoul (KR); Hoon Song, Yongin-si (KR); Bongsu Shin, Seoul (KR); Dongsik Shim, Hwaseong-si (KR); Jaeseung Chung, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 136 days.

(21) Appl. No.: 15/654,097

(22) Filed: Jul. 19, 2017

(65) Prior Publication Data
US 2018/0129060 A1    May 10, 2018

(30) Foreign Application Priority Data

Nov. 9, 2016    (KR) .................. 10-2016-0148592

(51) Int. Cl.
*F21V 8/00*  (2006.01)
*G02B 6/34*  (2006.01)
(Continued)

(52) U.S. Cl.
CPC .......... *G02B 30/00* (2020.01); *G02B 5/1861* (2013.01); *G02B 6/0011* (2013.01);
(Continued)

(58) Field of Classification Search
CPC . G02B 6/0011; G02B 6/0061; G02B 6/29316
See application file for complete search history.

(56) References Cited

U.S. PATENT DOCUMENTS 8,731,349 B2 *   5/2014   Schrauwen ............ G02B 6/124
                                                   385/14
9,557,466 B2 *   1/2017   Fattal .................... G02B 6/0068
(Continued)

FOREIGN PATENT DOCUMENTS

EP        1 734 401 A1    12/2006
JP        2010-76219 A    4/2010
(Continued)

OTHER PUBLICATIONS

Communication dated Apr. 5, 2018, issued by the European Patent Office in counterpart European Patent Application No. 17196444.8.
(Continued)

*Primary Examiner* — William N Harris
(74) *Attorney, Agent, or Firm* — Sughrue Mion, PLLC

(57) ABSTRACT

A backlight unit for a three-dimensional (3D) image display includes a light guiding plate configured to guide light; a light source configured to emit the light to the light guiding plate; and a diffraction grating structure provided on a surface of the light guiding plate, the diffraction grating structure configured to diffract the light emitted from the surface of the light guiding plate, and including diffracting gratings having different heights.

4 Claims, 14 Drawing Sheets

(51) Int. Cl.
*G02B 5/18* (2006.01)
*G02F 1/13357* (2006.01)
*G02B 30/00* (2020.01)

(52) U.S. Cl.
CPC ......... *G02B 6/0035* (2013.01); *G02B 6/0036* (2013.01); *G02B 6/0061* (2013.01); *G02B 6/0065* (2013.01); *G02B 6/34* (2013.01); *G02F 1/133602* (2013.01)

(56) References Cited

U.S. PATENT DOCUMENTS

| | | | | |
|---|---|---|---|---|
| 2006/0187677 | A1* | 8/2006 | Parikka | G02B 6/0031 362/619 |
| 2007/0058394 | A1* | 3/2007 | Yu | G02B 6/0038 362/615 |
| 2007/0189040 | A1* | 8/2007 | Chi | G02B 6/0036 362/620 |
| 2010/0072667 | A1 | 3/2010 | Kawakami et al. | |
| 2010/0142892 | A1 | 6/2010 | Kuittinen et al. | |
| 2011/0002143 | A1* | 1/2011 | Saarikko | B29D 11/00663 362/611 |
| 2013/0258711 | A1 | 10/2013 | Okuyama et al. | |
| 2014/0300840 | A1 | 10/2014 | Fattal et al. | |
| 2014/0300960 | A1 | 10/2014 | Santori et al. | |
| 2014/0314374 | A1 | 10/2014 | Fattal et al. | |
| 2015/0036068 | A1 | 2/2015 | Fattal et al. | |
| 2016/0291485 | A1 | 10/2016 | Funayoshi et al. | |
| 2016/0308020 | A1 | 10/2016 | Sreenivasan et al. | |
| 2017/0299793 | A1* | 10/2017 | Fattal | G02B 6/0036 |

FOREIGN PATENT DOCUMENTS

| | | |
|---|---|---|
| JP | 5910042 B2 | 4/2016 |
| KR | 10-2004-0090640 A | 10/2004 |
| WO | 2009/141332 A1 | 11/2009 |
| WO | 2016/111709 A1 | 7/2016 |

OTHER PUBLICATIONS

Communication dated May 28, 2019, issued by the European Patent Office in counterpart European Patent Application No. 17 196 444.8.

Communication dated Apr. 23, 2020 issued by the European Intellectual Property Office in counterpart European Application No. 17 196 444.8.

* cited by examiner

POINT #1

POINT #2

POINT #3

POINT #4

POINT #5

BACKLIGHT UNIT FOR 3D IMAGE DISPLAY AND METHOD OF MANUFACTURING THE BACKLIGHT UNIT

CROSS-REFERENCE TO RELATED APPLICATION

This application claims priority from Korean Patent Application No. 10-2016-0148592, filed on Nov. 9, 2016, in the Korean Intellectual Property Office, the disclosure of which is incorporated herein in its entirety by reference.

BACKGROUND

1. Field

Methods and apparatuses consistent with exemplary embodiments disclosed herein relate to a backlight unit for a three-dimensional (3D) image display and a method of manufacturing the backlight unit.

2. Description of the Related Art

In general, a three-dimensional (3D) image is formed based on the principle of stereoscopic vision through both eyes of a human. It may be said that binocular parallax caused by a distance between both eyes is the most important factor to achieve a 3D sense. A 3D image display may include a 3D image display using glasses and a 3D image display of a non-glasses type. A non-glasses type 3D image display obtains a 3D image by separating an image into left and right images without using glasses.

Recently, among the non-glasses type 3D image displays, a directional backlight based multiview method has been developed. According to the directional backlight based multiview method, directional light is formed through a diffraction grating structure formed on a light guiding plate (LGP) of a backlight unit so that low cross-talk is implemented, thereby providing a clear 3D image with a sense of depth.

SUMMARY

Exemplary embodiments provide a backlight unit for a three-dimensional (3D) image display and a method of manufacturing the backlight unit.

According to an aspect of an exemplary embodiment, there is provided a backlight unit for a three-dimensional (3D) image display, the backlight including: a light guiding plate configured to guide light; a light source configured to emit the light to the light guiding plate; and a diffraction grating structure provided on a surface of the light guiding plate, the diffraction grating structure configured to diffract the light emitted from the surface of the light guiding plate, and including diffracting gratings having different heights.

The diffraction gratings may be arranged to have the different heights on the surface of the light guiding plate, forming a height gradient.

The diffraction gratings may be arranged to have a height which increases from the surface as a distance from a light incident surface of the light guiding plate increases.

The diffraction gratings may have different widths from each other.

According to an aspect of another exemplary embodiment, there is provided a three-dimensional (3D) image display device, including: a backlight unit configured to emit diffracted light; and a display panel configured to modulate the light incident from the backlight unit according to image information, wherein the backlight unit includes: a light guiding plate configured to guide light; a light source configured to emit the light to the light guiding plate; and a diffraction grating structure provided on a surface of the light guiding plate, the diffraction grating structure configured to diffract the light emitted from the surface of the light guiding plate as the diffracted light, and including diffracting gratings having different heights.

The display panel may include a liquid crystal panel.

The diffraction gratings may be arranged to have the different heights on the surface of the light guiding plate, forming a height gradient.

The diffraction gratings may be arranged to have a height which increases from the surface as a distance from a light incident surface of the light guiding plate increases.

The diffraction gratings may have different widths from each other.

According to an aspect of another exemplary embodiment, there is provided a method of manufacturing a backlight unit for a 3D image display, the method including: preparing a stamp including grating patterns; coating a resin of an amount which varies depending on location, on a surface of a substrate; filling the resin between the grating patterns by pressing the stamp into the resin; and forming a diffraction grating structure including diffraction gratings on the surface of the substrate by curing the resin.

The pressing the stamp may include pressing the stamp such that heights of the resin filling spaces between the grating patterns vary, and the diffraction gratings may be thereby formed to have different heights.

The method may further include forming the diffraction gratings to have heights that gradually increase in a direction.

The grating patterns may have a same height.

The resin may include photocurable resin or thermosetting resin.

The method may further include forming the diffraction gratings to have different widths.

The substrate may include a light guiding plate.

The method may further include preparing another stamp including other grating patterns corresponding to the diffraction gratings by using the substrate and the diffraction grating structure as a master mold.

The method may further include: coating another resin on a surface of a light guiding plate; filling the other resin between the other grating patterns by pressing the other stamp into the other resin; and forming another diffraction grating structure including a plurality of other diffraction gratings on the surface of the light guiding plate by curing the other resin.

The pressing the other stamp may include pressing the other resin such that the other resin completely fills spaces between the other grating patterns.

The diffraction gratings and the other diffraction gratings may have a same shape.

Additional aspects will be set forth in part in the description which follows and, in part, will be apparent from the description, or may be learned by practice of the presented exemplary embodiments.

BRIEF DESCRIPTION OF THE DRAWINGS

These and/or other aspects will become apparent and more readily appreciated from the following description of the exemplary embodiments, taken in conjunction with the accompanying drawings in which.

DETAILED DESCRIPTION

Figure 1:
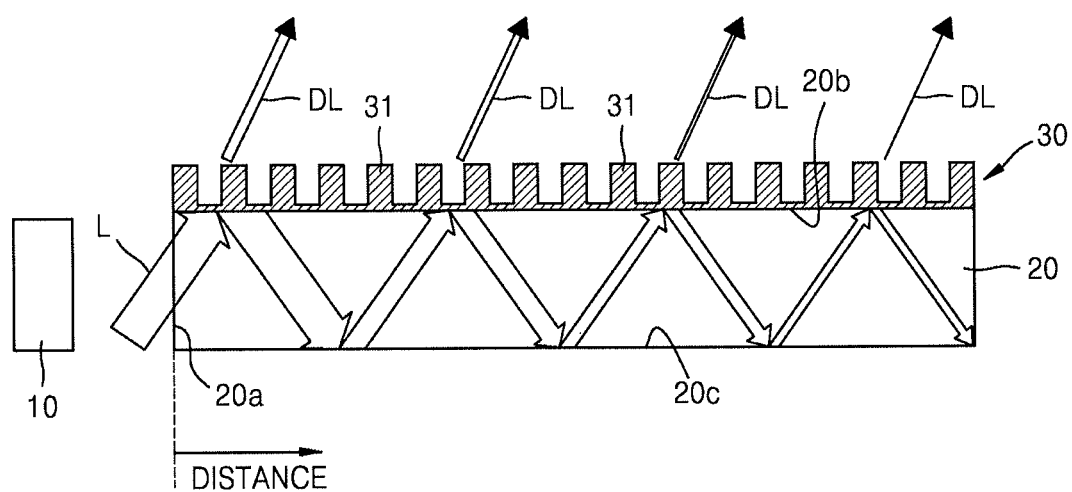
FIG. 1 is a cross-sectional view schematically illustrating a general backlight unit for a three-dimensional (3D) image display.

Reference will now be made in detail to exemplary embodiments, examples of which are illustrated in the accompanying drawings, wherein like reference numerals refer to like elements throughout. Also, the size of each layer illustrated in the drawings may be exaggerated for convenience of explanation and clarity. In this regard, the present exemplary embodiments may have different forms and should not be construed as being limited to the descriptions set forth herein. Accordingly, the exemplary embodiments are merely described below, by referring to the figures, to explain aspects of the present description. In a layer structure, when a constituent element is disposed "above" or "on" to another constituent element, the constituent element may be directly on the other constituent element or above the other constituent elements in a non-contact manner.

Also, in the following description, when a material layer is described to exist on another layer, the material layer may exist directly on the other layer or a third layer may be interposed therebetween. Since a material forming each layer in the following exemplary embodiments is exemplary, other materials may be used therefor.

FIG. 1 is a cross-sectional view schematically illustrating a general backlight unit for a three-dimensional (3D) image display.

Referring to FIG. 1, a backlight unit may include a light source 10, a light guiding plate 20 guiding light L incident from the light source 10 to exit through an exit surface 20b, and a diffraction grating structure 30 provided on the exit surface 20b of the light guiding plate 20. The light guiding plate 20 guides the light L incident from the light source 10 to be totally reflected inside the light guiding plate 20 and to have the light L exit through the exit surface 20b. The light guiding plate 20 may include an incident surface 20a on which the light L is incident, the exit surface 20b from which the light L incident through the incident surface 20a exits, and a reflective surface 20c facing the exit surface 20b.

The diffraction grating structure 30 may diffract the light coming from the exit surface 20b of the light guiding plate 20 to proceed in a certain direction. A diffracted exit light DL having directionality coming from the diffraction grating structure 30 is modulated by a display panel so that a 3D image may be implemented. The diffraction grating structure 30 may include a plurality of diffraction gratings 31 provided on the exit surface 20b of the light guiding plate 20 to be spaced apart from one another. The diffraction gratings 31 may have the same height.

Since, according to the above configuration of the backlight unit, the diffraction grating structure 30 includes the diffraction gratings 31 having the same height, uniformity of the diffracted exit light DL coming from the diffraction grating structure 30 may be degraded.

Figure 2:
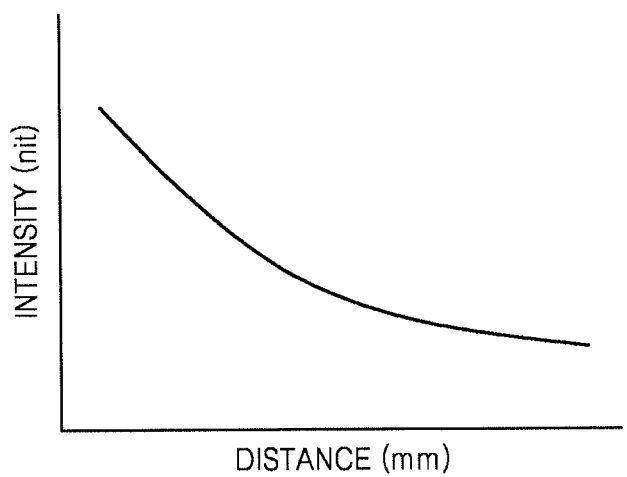
FIG. 2 is a graph showing the intensity of diffracted exit light coming from a diffraction grating structure depending on location, in the backlight unit of FIG. 1.

FIG. 2 is a graph showing the intensity of the diffracted exit light DL coming from the diffraction grating structure 30 depending on location, in the backlight unit of FIG. 1. In FIG. 2, a distance refers to a distance away from the incident surface 20a of the light guiding plate 20, and the intensity refers to the intensity of the diffracted exit light DL coming from the diffraction grating structure 30.

Referring to FIG. 2, it may be seen that the intensity of the diffracted exit light DL coming from the diffraction grating structure 30 becomes weaker as the distance from the incident surface 20a of the light guiding plate 20 increases. As such, in the diffraction grating structure 30 of a general backlight unit, as the heights of the diffraction gratings 31 are the same, diffraction efficiencies are almost the same in the whole area of the diffraction grating structure 30. Accordingly, as the light L incident on the light guiding plate 20 gradually proceeds inside the light guiding plate 20, the intensity of the diffracted exit light DL coming from the diffraction grating structure 30 gradually becomes weaker. In other words, the intensity of the diffracted exit light DL coming from the diffraction grating structure 30 gradually becomes weaker as the distance from the incident surface 20a of the light guiding plate 20 increases. As such, in the general backlight unit, as the intensity of the diffracted exit light DL coming from the light guiding plate 20 varies depending on location, the uniformity of the diffracted exit light DL may be degraded.

Figure 3:
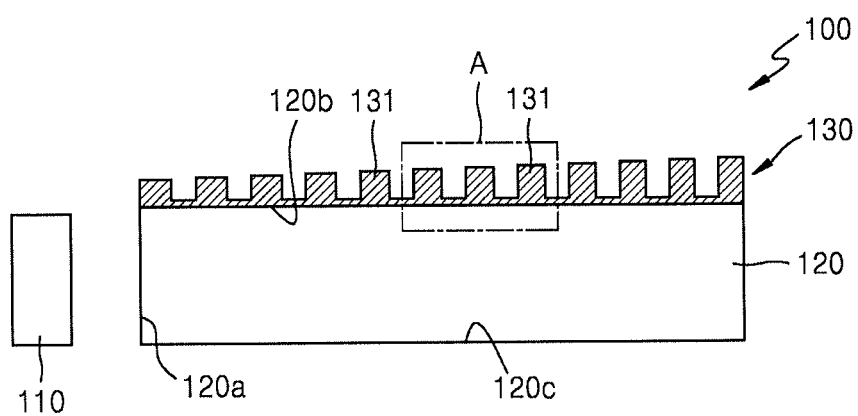
FIG. 3 is a cross-sectional view schematically illustrating a backlight unit for a 3D image display according to an exemplary embodiment.
Figure 4:
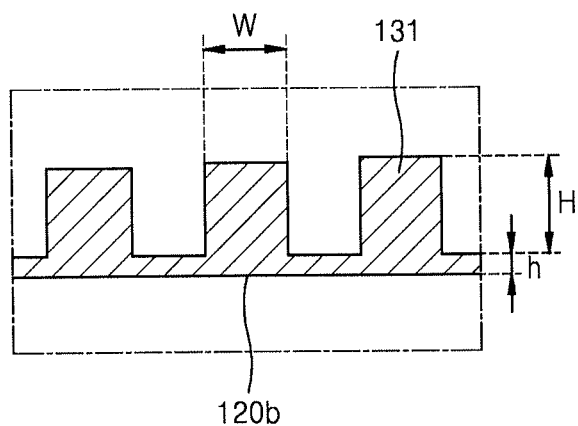
FIG. 4 is an enlarged cross-sectional view of a portion A of FIG. 3.

FIG. 3 is a cross-sectional view schematically illustrating a backlight unit for a 3D image display according to an exemplary embodiment. FIG. 4 is an enlarged cross-sectional view of a portion A of FIG. 3.

Referring to FIGS. 3 and 4, a backlight unit 100 may include a light source 110, a light guiding plate 120, and a diffraction grating structure 130. The light source 110 may be arranged at at least one side of the light guiding plate 120, and light may be irradiated onto at least one surface of the light guiding plate 120. Although FIG. 3 illustrates an example in which the light source 110 is provided at the left of the light guiding plate 120, the position of the light source 110 may be changed in various ways. The light source 110 may include, for example, a light emitting diode (LED) or a laser diode (LD), but the exemplary embodiments are not limited thereto.

The light guiding plate 120 guides the light incident from the light source 110 to be totally reflected inside the light guiding plate 120 and to have part of the light exit through an exit surface 120b. The light guiding plate 120 may include a transparent material, for example, glass or a transparent plastic member. The light guiding plate 120 may include an incident surface 120a on which light emitted from the light source 110 is incident, the exit surface 120b through which the light incident through the incident surface 120a exits, and a reflective surface 120c facing the exit surface 120b.

The diffraction grating structure 130 is provided on the exit surface 120b of the light guiding plate 120 and diffracts light coming from the exit surface 120b to proceed in a certain direction. Diffracted exit light coming from the diffraction grating structure 130 and having directionality is modulated by a display panel, thereby implementing a 3D image. The diffraction grating structure 130 may include a plurality of diffraction gratings 131 provided on the exit surface 120b of the light guiding plate 120 to be spaced apart from one another. The diffraction grating structure 130 may include, for example, photocurable or thermosetting resin, and may be formed in a nano implant process that is described later.

In the present exemplary embodiment, each of the diffraction gratings 131 of the diffraction grating structure 130 has a different height H so that a certain height gradient may be formed. The height H of each of the diffraction gratings 131 may denote a height from a bottom surface between the diffraction gratings 131 to an upper surface of each of the diffraction gratings 131. A bottom surface between the diffraction gratings 131 may have the same height h from the exit surface 120b of the light guiding plate 120. Accordingly, each of the diffraction gratings 131 of the diffraction grating structure 130 may have a different height (H+h) from the exit surface 120b of the light guiding plate 120.

FIG. 3 illustrates a case in which each of the diffraction gratings 131 of the diffraction grating structure 130 has the height H that gradually increases in one direction. In detail, the diffraction gratings 131 of the diffraction grating structure 130 may be arranged such that the height H of each of the diffraction gratings 131 gradually increases as a distance from the incident surface 120a of the light guiding plate 120 increases. The height H of each of the diffraction gratings 131 may continuously or discretely vary in one direction.

As such, by changing the height H of each of the diffraction gratings 131 of the diffraction grating structure 130 depending on location, diffraction efficiency of the diffraction gratings 131 may be adjusted according to the position thereof. For example, when the height H of each of the diffraction gratings 131 gradually increases as the distance from the incident surface 120a of the light guiding plate 120 increases, the diffraction efficiency of the diffraction gratings 131 gradually increases corresponding to the heights H of the diffraction gratings 131 as the distance from the incident surface 120a of the light guiding plate 120 increases. Accordingly, the diffracted exit light coming from the diffraction grating structure 130 may have uniform intensity across all positions.

In the above description, a case in which the height H of each of the diffraction gratings 131 of the diffraction grating structure 130 increases in one direction is exemplarily described. However, the exemplary embodiments are not limited thereto, and diffraction efficiency may be adjusted depending on location by changing the heights H of the diffraction gratings 131 in various ways. For example, the diffraction gratings 131 of the diffraction grating structure 130 may have the same height H in some areas. Furthermore, the diffraction gratings 131 of the diffraction grating structure 130 may be arranged such that the height H of each of the diffraction gratings 131 does not gradually increase.

In order to adjust the diffraction efficiency of the diffraction gratings 131, not only the height H of each of the diffraction gratings 131, but also a width W of each of the diffraction gratings 131, may be changed. In FIG. 3, the width W of each of the diffraction gratings 131 of the diffraction grating structure 130 decreases as a distance from the incident surface 120a of the light guiding plate 120 increases. However, the exemplary embodiments are not limited thereto, and the diffraction efficiency may be adjusted depending on location by changing the width W of each of the diffraction gratings 131 of the diffraction grating structure 130 in various ways.

Figure 5:
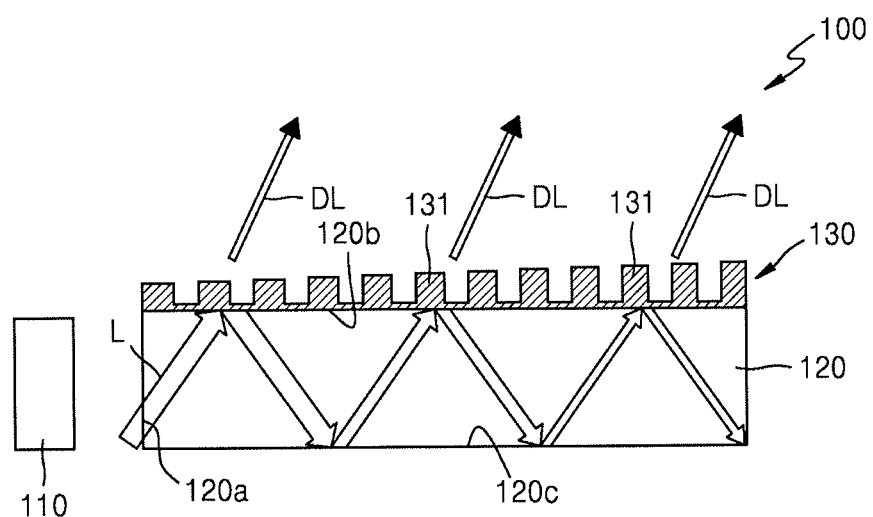
FIG. 5 is a cross-sectional view schematically illustrating diffracted exit light coming from a diffraction grating structure, in the backlight unit of FIG. 3.

FIG. 5 is a cross-sectional view schematically illustrating the diffracted exit light DL coming from the diffraction grating structure 130, in the backlight unit 100 of FIG. 3.

Referring to FIG. 5, the light L emitted from the light source 110 provided at one side of the light guiding plate 120 may be incident on the incident surface 120a of the light guiding plate 120 and then may proceed totally reflected inside the light guiding plate 120. In this process, the light coming from the exit surface 120b of the light guiding plate 120 is diffracted by the diffraction grating structure 130 to have directionality. As described above, since the diffraction gratings 131 of the diffraction grating structure 130 are provided such that the height H of each of the diffraction gratings 131 gradually increases as the distance from the incident surface 120a of the light guiding plate 120 increases, the diffraction efficiency of the diffraction gratings 131 may gradually increase as the distance from the incident surface 120a of the light guiding plate 120 increases. As such, as the diffraction efficiency of the diffraction gratings 131 is adjusted to gradually increase as the distance from the incident surface 120a of the light guiding plate 120 increases, the intensity of the diffracted exit light DL coming from the diffraction grating structure 130 may be uniform across all positions. Accordingly, the uniformity and brightness of the diffracted exit light DL may be secured.

Figure 6:
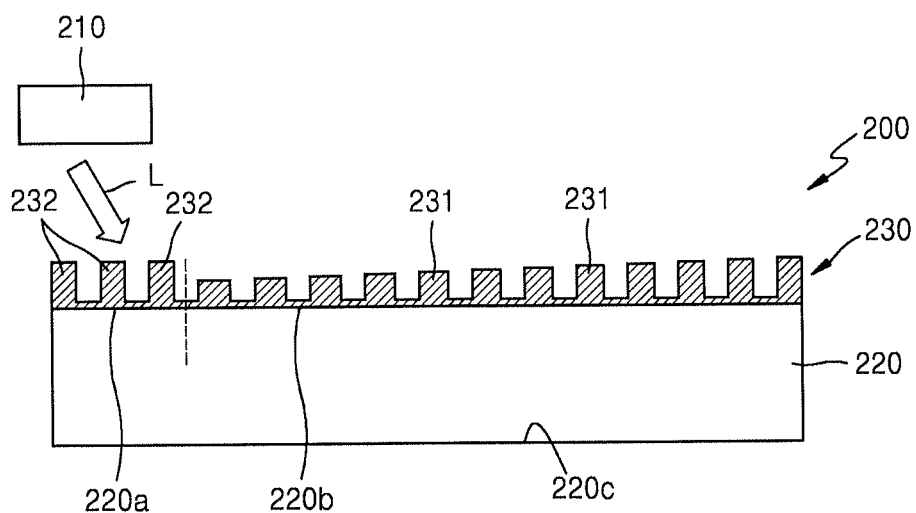
FIG. 6 is a cross-sectional view schematically illustrating a backlight unit for a 3D image display according to another exemplary embodiment.

FIG. 6 is a cross-sectional view schematically illustrating a backlight unit 200 for a 3D image display according to another exemplary embodiment.

Referring to FIG. 6, the backlight unit 200 may include a light source 210, a light guiding plate 220, and a diffraction grating structure 230. The light source 210 may be arranged above an upper surface of the light guiding plate 220. FIG. 6 illustrates a case in which the light source 210 is arranged above an upper left surface of the light guiding plate 220. The light L emitted from the light source 210 may be incident on the upper left surface of the light guiding plate 220.

The light guiding plate 220 guides the light L incident from the light source 210 to be totally reflected inside the light guiding plate 220. In this process, part of the light L exits through an exit surface 220b located above. The light guiding plate 220 may include an incident surface 220a on which the light L emitted from the light source 210 is incident, the exit surface 220b through which the light incident from the incident surface 220a exits, and a reflective surface 220c facing the exit surface 220b. As described above, since the light L emitted from the light source 210 is incident on the upper left surface of the light guiding plate 220, the incident surface 220a of the light guiding plate 220 may be the upper left surface of the light guiding plate 220. The light incident on the upper left surface of the light guiding plate 220 at a certain angle may proceed totally reflected inside the light guiding plate 220. In this case, the exit surface 220b of the light guiding plate 220 may be upper center and right surfaces of the light guiding plate 220.

The diffraction grating structure 230 is provided on the upper surface of the light guiding plate 220. The diffraction grating structure 230 may include a plurality of diffraction gratings 232 provided on the incident surface 220a of the light guiding plate 220 and a plurality of diffraction gratings 231 provided on the exit surface 220b of the light guiding plate 220.

The diffraction gratings 231 on the exit surface 220b of the light guiding plate 220 diffract the light coming from the exit surface 220b to proceed in a certain direction. The diffraction gratings 231 on the exit surface 220b of the light guiding plate 220 have different heights forming a certain height gradient. For example, the diffraction gratings 231 on the exit surface 220b of the light guiding plate 220 may be arranged such that the height of each of the diffraction gratings 231 gradually increases as a distance from the incident surface 220a of the light guiding plate 220 increases. As such, by changing the heights of the diffraction gratings 231 of the diffraction grating structure 230 depending on location, a diffraction efficiency of the diffraction gratings 231 may be adjusted depending on location. Furthermore, to adjust the diffraction efficiency of the diffraction gratings 231 provided on the exit surface 220b of the light guiding plate 220, not only the heights of the diffraction gratings 231, but also a width of each of the diffraction gratings 231, may be changed.

The diffraction gratings 232 on the incident surface 220a of the light guiding plate 220 may have the same shape so that the intensity of the light L incident on the incident surface 220a from the light source 210 may be uniform depending on location. For example, the diffraction gratings 232 on the incident surface 220a of the light guiding plate 220 may have the same height and width. Alternatively, the diffraction gratings 232 may not be provided on the incident surface 220a of the light guiding plate 220.

Figure 7:
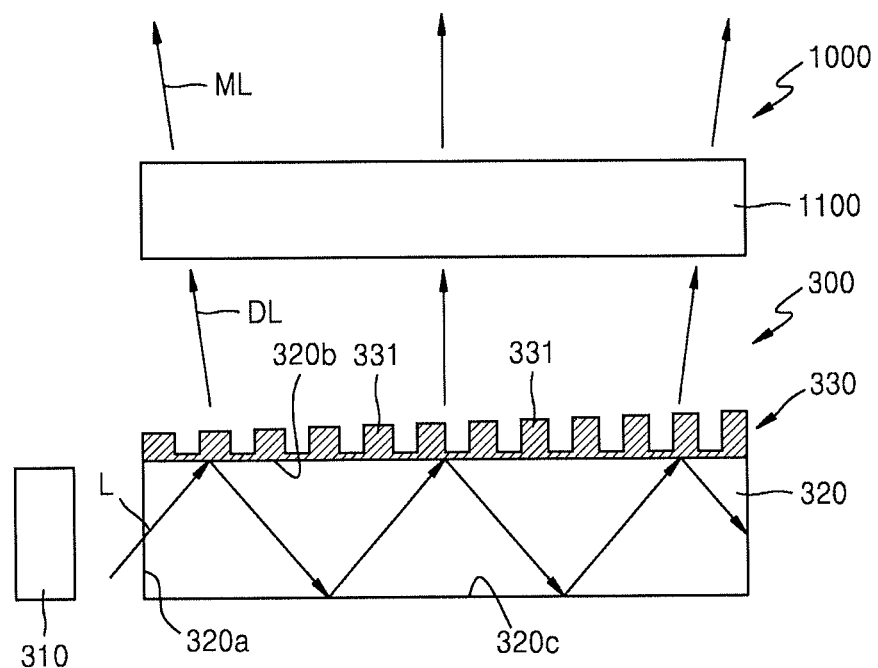
FIG. 7 is a cross-sectional view schematically illustrating a 3D image display device according to another exemplary embodiment.

FIG. 7 is a cross-sectional view schematically illustrating a 3D image display device 1000 according to another exemplary embodiment.

Referring to FIG. 7, the 3D image display device 1000 may include a backlight unit 300 and a display panel 1100 which modulates light incident from the backlight unit 300.

The backlight unit 300 may include a light source 310, a light guiding plate 320, and a diffraction grating structure 330. The light source 310 is arranged at one side of the light guiding plate 320 and emits light toward an incident surface 320a of the light guiding plate 320. The light guiding plate 320 guides light L incident from the light source 310 to be totally reflected inside the light guiding plate 320 and to have part of the light L exit through an exit surface 320b located above. The light guiding plate 320 may include the incident surface 320a on which the light L emitted from the light source 310 is incident, the exit surface 320b through which the light from the incident surface 320a exits, and a reflective surface 320c facing the exit surface 320b.

The diffraction grating structure 330 is provided on the exit surface 320b of the light guiding plate 320 and diffracts the light coming from the exit surface 320b to proceed in a certain direction. The diffraction grating structure 330 may include a plurality of diffraction gratings 331 provided spaced apart from each other on the exit surface 320b of the light guiding plate 320. The diffraction gratings 331 on the exit surface 320b of the light guiding plate 320 may have different heights. In detail, the diffraction gratings 331 of the diffraction grating structure 330 may be arranged to have the heights that gradually increase as a distance from the incident surface 320a of the light guiding plate 320 increases. A diffraction efficiency of the diffraction gratings 331 may be adjusted according to the position of each of the diffraction gratings 331 by changing the heights of the diffraction gratings 331 of the diffraction grating structure 330 depending on location. Accordingly, the intensity of the diffracted exit light DL coming from the diffraction grating structure 330 of the backlight unit 300 and having directionality may be uniform across all positions.

The display panel 1100 is provided above the backlight unit 300. The display panel 1100 may modulate the diffracted exit light DL coming from the backlight unit 300 and having directionality according to image information and then have the modulated light exit. Although the display panel 1100 may be, for example, a liquid crystal display (LCD) panel, the exemplary embodiments are not limited thereto.

The modulated lights ML coming from the display panel 1100 in different directions provide different views in a plurality of viewing zones, thereby displaying a 3D image. As such, as different views are provided in a plurality of viewing zone, viewers may recognize a 3D image. In the above description, although an example of using the backlight unit 100 of FIG. 3 as the backlight unit 300 of the 3D image display device 1000 is described, the backlight unit 200 of FIG. 6 may be used as well.

FIGS. 8, 9, 10, 11, 12, 13, and 14 are cross-sectional views schematically illustrating a method of manufacturing a backlight unit for a 3D image display, according to an exemplary embodiment.

Figure 8:
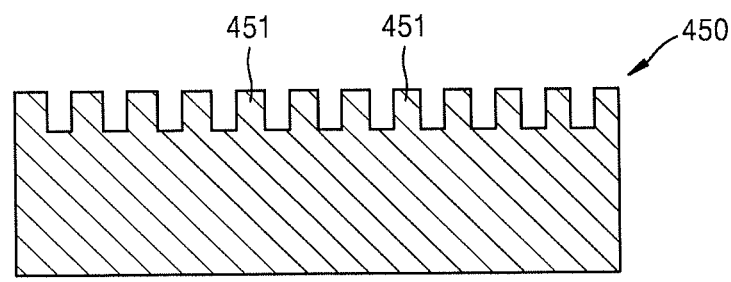
FIGS. 8, 9, 10, 11, 12, 13, and 14 are cross-sectional views illustrating a method of manufacturing a backlight unit for a 3D image display, according to an exemplary embodiment.

Referring to FIG. 8, first, a master mold 450 is prepared. A plurality of mold patterns 451 are formed on one surface of the master mold 450 to be spaced apart from each other. The mold patterns 451 of the master mold 450 may have the same height. The height of each of the mold patterns 451 may denote a height from a bottom surface of each of the mold patterns 451 to an upper surface of each of the mold patterns 451. Furthermore, at least some of the mold patterns 451 may have a different width. The master mold 450 including the mold patterns 451 may be manufactured by, for example, photolithography or E-beam lithography.

Figure 9:
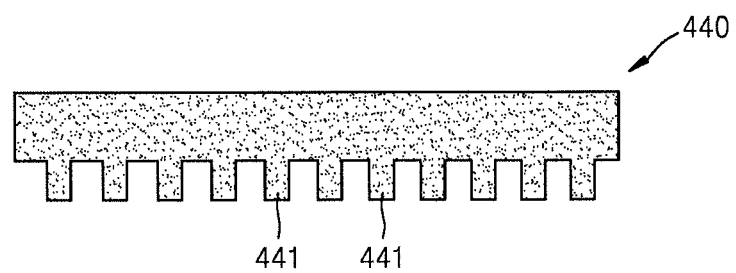

Referring to FIG. 9, a stamp 440 is replicated by using the master mold 450 of FIG. 8. The stamp 440 may be manufactured by coating resin for replication to cover the mold patterns 451 of the master mold 450, pressing the resin for replication, and curing the resin by using light or heat. Accordingly, a plurality of grating patterns 441 that are complementary to the mold patterns 451 of the master mold 450 may be formed on one surface of the stamp 440. The grating patterns 441 of the stamp 440 may have the same height as the mold patterns 452.

Figure 10:
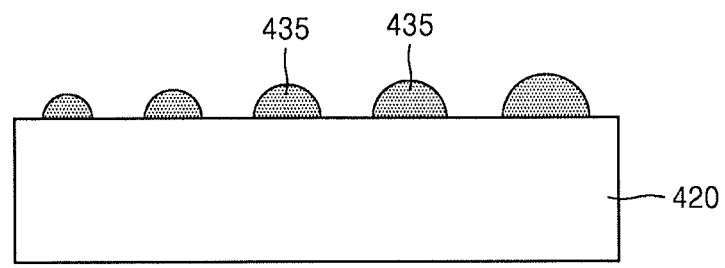

Referring to FIG. 10, resin 435 is coated on an upper surface of a substrate 420. In this state, although the substrate 420 may include a light guiding plate, the exemplary embodiments are not limited thereto. In the process, the amount of the resin 435 coated on an upper surface of the substrate 420 may be adjusted depending on location. For example, the amount of the resin 435 may be adjusted such that a larger amount of the resin 435 is coated as a distance from one side surface of the substrate 420 increases. The resin 435 may include, for example, photocurable or thermosetting resin.

Figure 11:
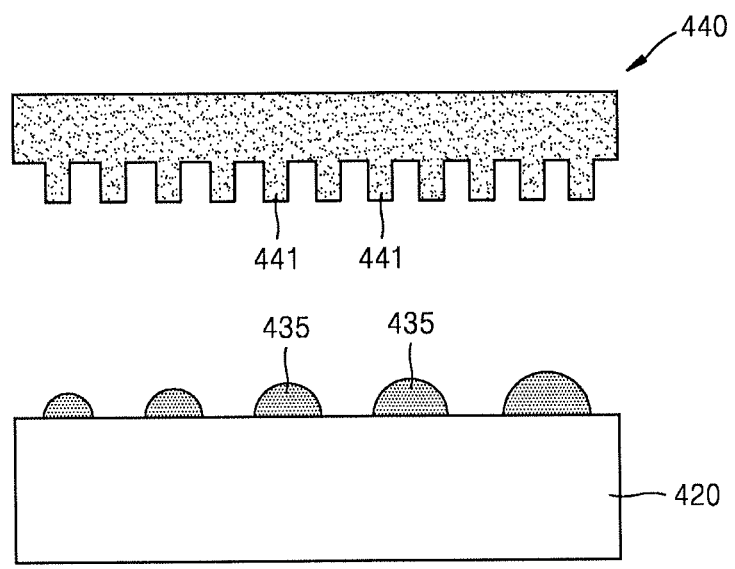

Referring to FIG. 11, the stamp 440 is provided above the substrate 420. The stamp 440 may be arranged such that the grating patterns 441 of the stamp 440 face the resin 435 coated on the substrate 420. Next, referring to FIG. 12, the stamp 440 contacts the resin 435 and presses against the resin 435 with pressure. In this case, a pressure plate 445 formed of a hard material may be further provided on an upper surface of the stamp 440 to apply a uniform pressure to the stamp 440.

Figure 12:
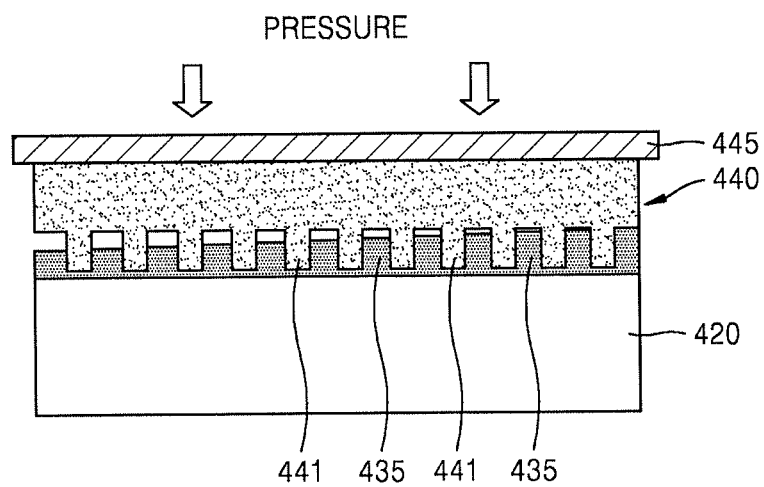

As illustrated in FIG. 12, when pressure is applied to the stamp 440, the resin 435 may fill between the grating patterns 441 formed on the stamp 440. The resin 435 may completely or partially fill spaces between the grating patterns 441. As described above, since the amount of the resin 435 to be coated on the upper surface of the substrate 420 varies depending on location, the amount of the resin 435 filling the spaces between the grating patterns 441 may vary. In detail, when the amount of the resin 435 to be coated gradually increases as the distance from one side surface of the substrate 420 increases, the amount of the resin 435 filling the spaces between the grating patterns 441 gradually increases as the distance from one side surface of the substrate 420 increases. Accordingly, the height of the resin 435 filling the spaces between the grating patterns 441 may gradually increase as the distance from one side surface of the substrate 420 increases.

Figure 13:
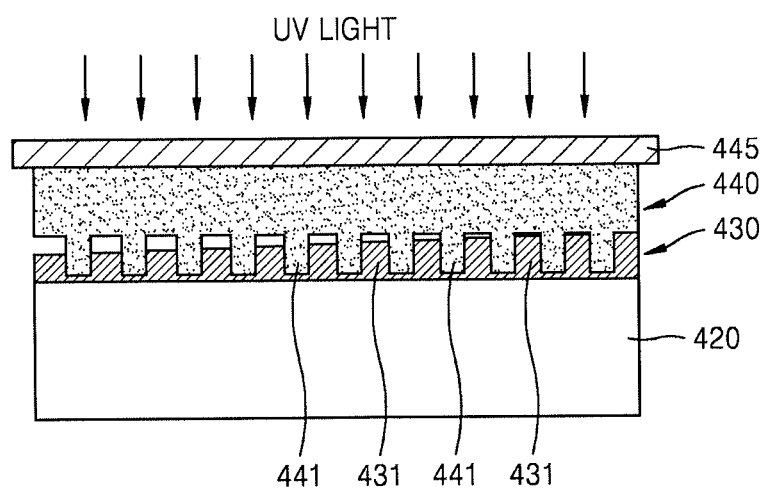
Figure 14:
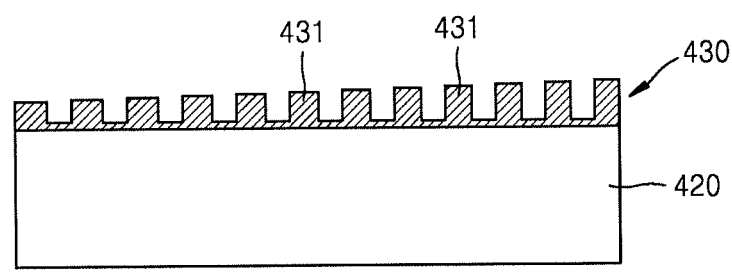

Referring to FIG. 13, in a state illustrated in FIG. 12, when light, for example, ultraviolet (UV) light, is irradiated onto the resin 435 via the pressure plate 445 and the stamp 440, the resin 435 may be cured. Next, when the pressure plate 445 and the stamp 440 are detached from the cured resin 435, a diffraction grating structure 430 including a plurality of diffraction gratings 431 may be formed on the upper surface of the substrate 420 as illustrated in FIG. 14. FIG. 13 illustrates an example in which the resin 435 is formed of photocurable resin and the resin 435 is cured by the irradiation of UV light, thereby forming the diffraction grating structure 430. However, the exemplary embodiments are not limited thereto and the resin 435 may be formed of thermosetting resin. It is possible to form the diffraction grating structure 430 by curing the resin 435 by using heat.

As described above, as the height of the resin 435 filing the spaces between the grating patterns 441 varies, the heights of the diffraction gratings 431 of the diffraction grating structure 430 may gradually increase as the distance from one side surface of the substrate 420 increases. The height of each of the diffraction gratings 431 may denote a height from a bottom surface of each of the diffraction gratings 431 to an upper surface of each of the diffraction gratings 431. The bottom surfaces between the diffraction gratings 431 may be formed to the same height from the upper surface of the substrate 420. Accordingly, the diffraction gratings 431 of the diffraction grating structure 430 may be formed to have different heights from the upper surface of the substrate 420.

By performing the process described above in FIGS. 8 to 14 once or multiple times, the diffraction grating structure 430 including the diffraction gratings 431 having heights that are finely adjusted depending on location may be manufactured. As described above, when a light guiding plate is used as the substrate 420, the diffraction grating structure 430 including the diffraction gratings 431 having adjusted heights is formed on the upper surface of the substrate 420, and a light source (not shown) is arranged at one or several sides of the substrate 420. Accordingly, a backlight unit for a 3D image display may be manufactured.

Although in the above description a case in which the heights of the diffraction gratings 431 increase as the distance from one side surface of the substrate 420 increases is described, the exemplary embodiments are not limited thereto, and by adjusting the amount of the resin 435 coated on the upper surface of the substrate 420 depending on location, the heights of the diffraction gratings 431 may be variously changed depending on location.

FIGS. 15A, 15B, 15C, 15D, 15E, and 15F are scanning electron microscope (SEM) images of diffraction gratings of a diffraction grating structure manufactured by the method of FIGS. 8 to 14.

Figure 15A:
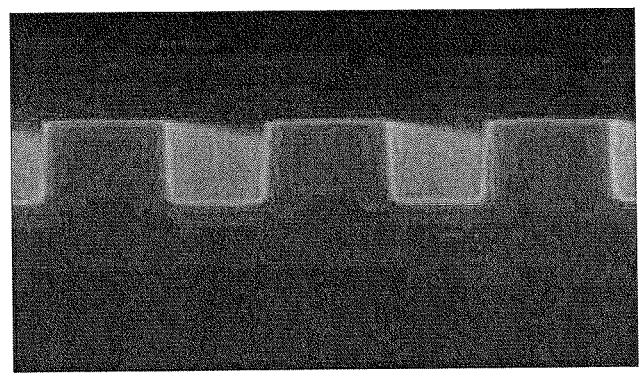
FIG. 15A is a scanning electron microscope (SEM) image of a master mold manufactured of silicon.
Figure 15B:
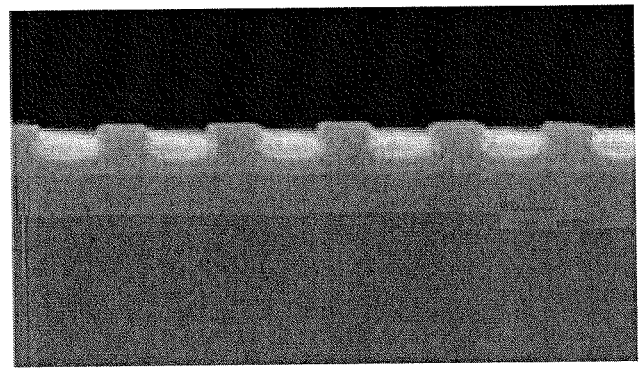
FIGS. 15B, 15C, 15D, 15E, and 15F are SEM images of diffraction gratings of a diffraction grating structure manufactured by the method of FIGS. 8 to 14 by using the master mold of FIG. 15A.
Figure 15C:
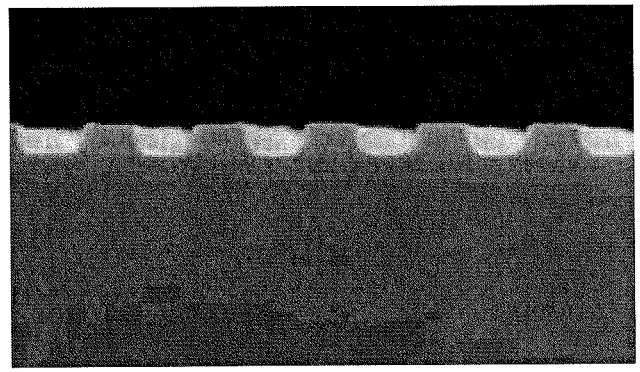
Figure 15D:
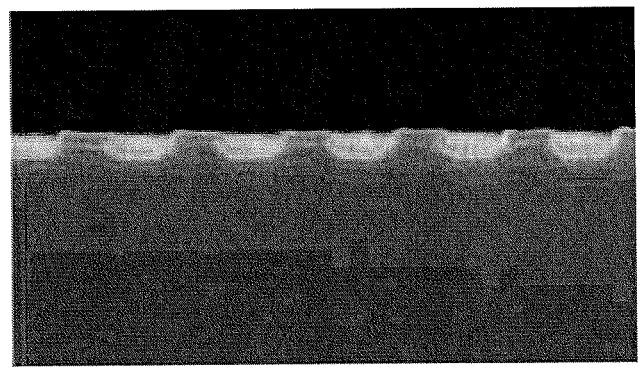
Figure 15E:
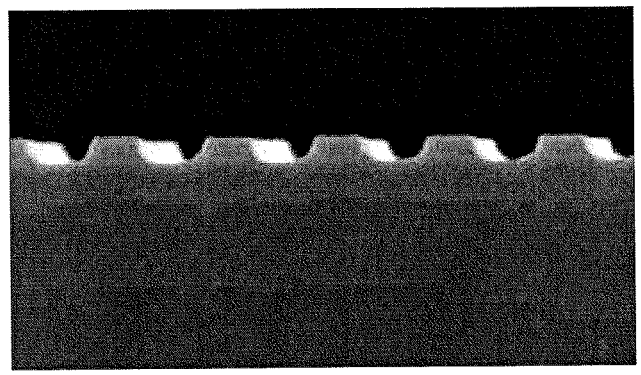
Figure 15F:
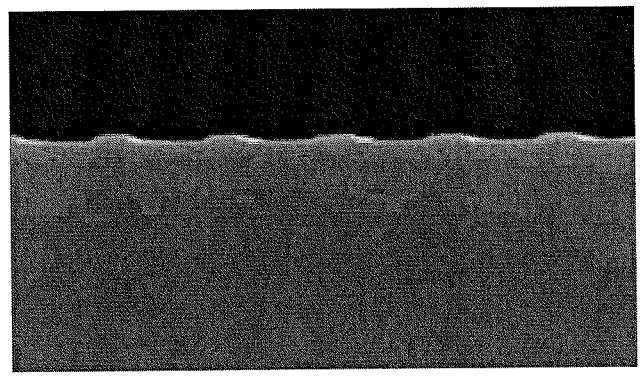

FIG. 15A is an SEM image of a master mold manufactured of silicon. The master mold illustrated in FIG. 15A may include molding patterns having the same height of about 165 nm.

FIGS. 15B to 15F are SEM images of the diffraction gratings of the diffraction grating structure manufactured by the method of FIGS. 8 to 14 by using the master mold of FIG. 15A. In detail, FIGS. 15B to 15F are SEM images of the diffraction gratings located at five points #1 to #5 in the diffraction grating structure.

FIGS. 15B, 15C, 15D, 15E, and 15F illustrate the diffraction gratings located at Point #1, Point #2, Point #3, Point #4, and Point #5, respectively. Point #1, Point #2, Point #3, Point #4, and Point #5 indicate positions spaced from one side surface of a diffraction grating structure, respectively, by 10 nm, 20 nm, 30 nm, 40 nm, and 50 nm.

Figure 16:
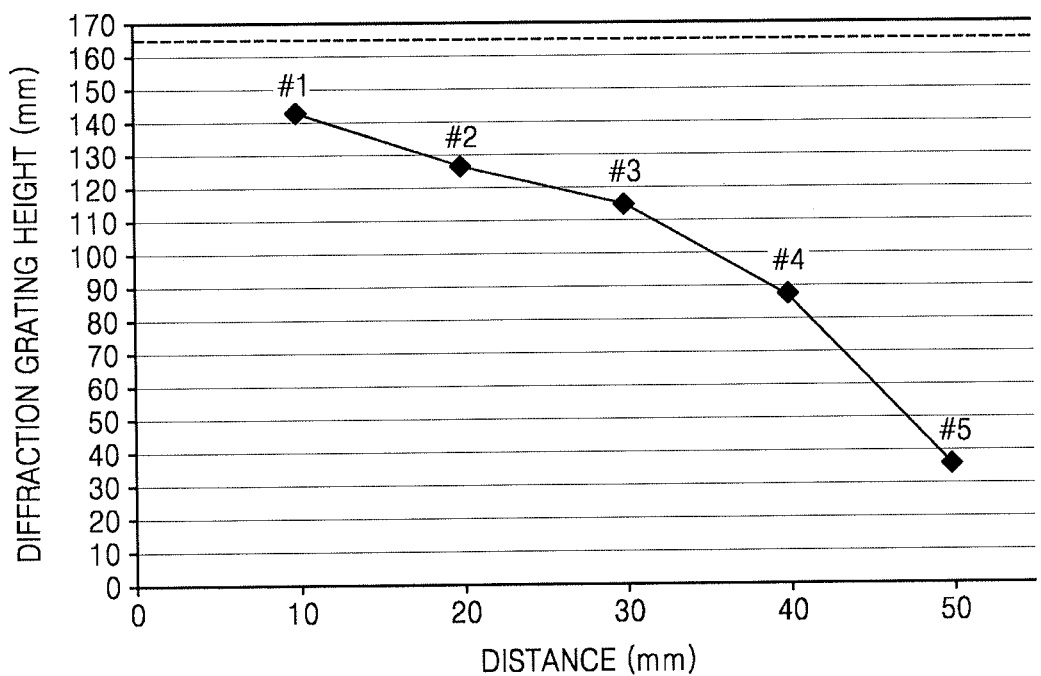
FIG. 16 is a graph showing a result of measurement of the heights of the diffraction gratings located at five points illustrated in FIGS. 15B to 15F.

FIG. 16 is a graph showing a result of measurement of the heights of the diffraction gratings located at five points illustrated in FIGS. 15B to 15F. Referring to FIG. 16, the diffraction gratings are formed to a height in a range from about 35 nm to about 145 nm. It may be seen that the heights of the diffraction gratings are about 22% to about 87% of the heights (165 nm) of the mold patterns formed on the silicon master mold illustrated in FIG. 15A.

FIGS. 17, 18, 19, 20, 21, 22, and 23 are cross-sectional views schematically illustrating a method of manufacturing a backlight unit for a 3D image display, according to another exemplary embodiment. FIGS. 17 to 23 illustrate operations of manufacturing a backlight unit by using the substrate 420 and the diffraction grating structure 430 of FIG. 14 as a master mold 550.

Figure 17:
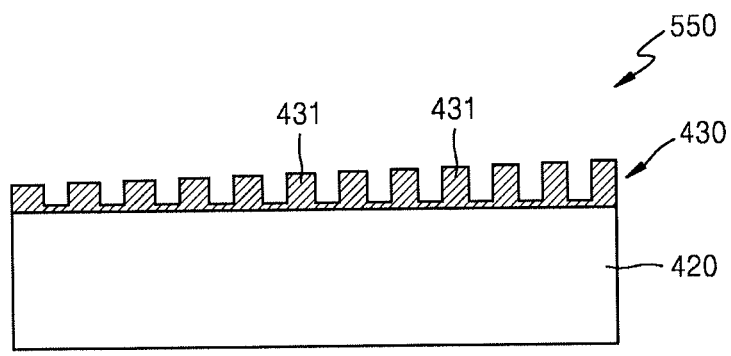
FIGS. 17, 18, 19, 20, 21, 22, and 23 are cross-sectional views schematically illustrating a method of manufacturing a backlight unit for a 3D image display, according to another exemplary embodiment.

Referring to FIG. 17, the master mold 550 is prepared. The master mold 550 may be the substrate 420 and the diffraction grating structure 430 of FIG. 14. Accordingly, the diffraction gratings 431 of the diffraction grating structure 430 of FIG. 14 may be the mold patterns 431 of the master mold 550. Accordingly, the master mold 550 of FIG. 17 may include the mold patterns 431 having heights that are adjusted depending on location. For example, the mold patterns 431 may be arranged such that the heights of the mold patterns 431 gradually increase as a distance from one side surface of the master mold 550 increases. The height of each of the mold patterns 431 may denote a height from a bottom surface between the mold patterns 431 to a top surface of each of the mold pattern 431. The bottom surface between the mold patterns 431 may be formed to have the same height from the upper surface of the substrate 420.

Figure 18:
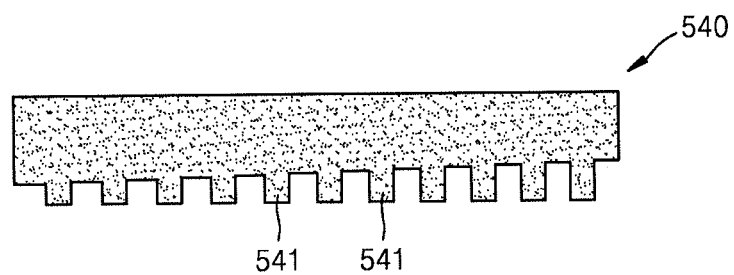

Referring to FIG. 18, a stamp 540 is replicated by using the master mold 550 of FIG. 17. The stamp 540 may be manufactured by coating resin for replication to cover the mold patterns 431 of the master mold 450, pressing the resin for replication, and curing the resin by using light or heat. According to the above replication process, a plurality of grating patterns 541 that are complementary to the mold patterns 431 of the master mold 550 may be formed on one surface of the stamp 540. Accordingly, spaces between the grating patterns 541 of the stamp 540 may have the same shape as the mold patterns 431 of the master mold 550.

Figure 19:
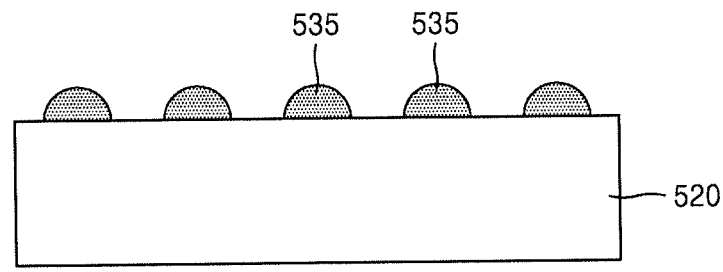

Referring to FIG. 19, resin 535 is coated on an upper surface of the light guiding plate 520. The light guiding plate 520 may include a transparent material, for example, glass or a transparent plastic material. The amount of the resin 535 coated on the upper surface of the light guiding plate 520 across all positions may be uniform. However, the exemplary embodiments are not limited thereto and the amount of the resin 535 coated on the upper surface of the light guiding plate 520 may be adjusted depending on location. The resin 535 may include, for example, photocurable or thermosetting resin.

Figure 20:
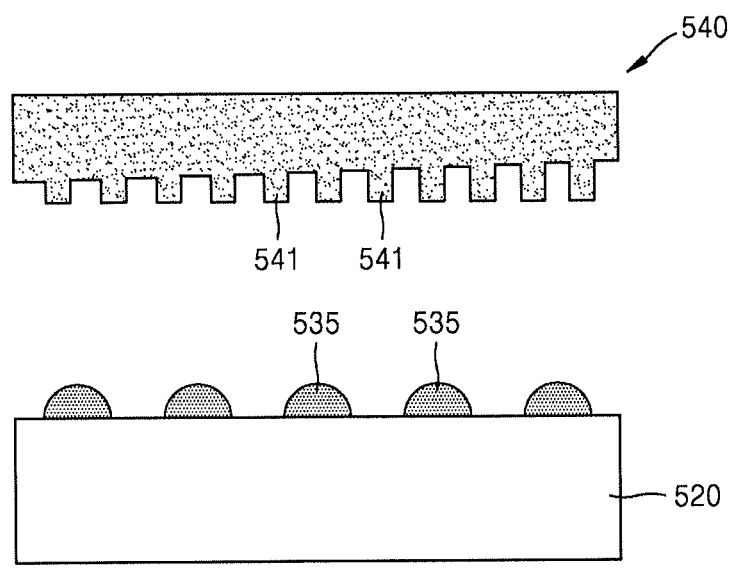
Figure 21:
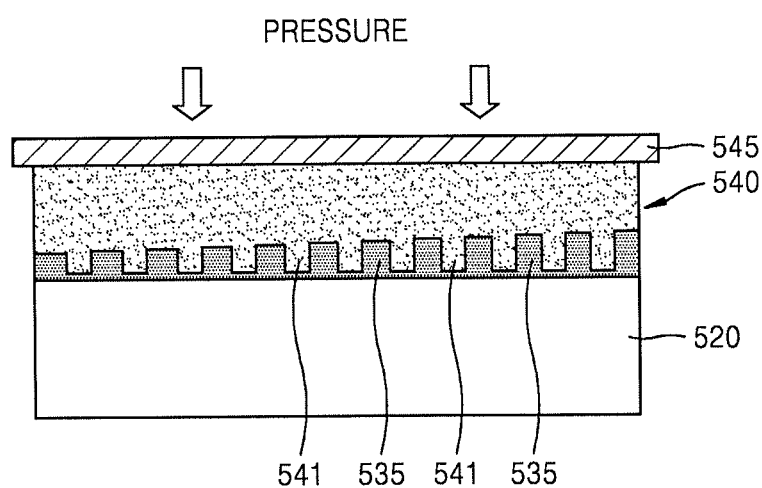

Referring to FIG. 20, the stamp 540 is provided above the light guiding plate 520. The stamp 540 may be arranged such that the grating patterns 541 of the stamp 540 face the resin 535 coated on the light guiding plate 520. Next, referring to FIG. 21, the stamp 540 contacts the resin 535 and is pressed against the resin 535 with pressure. In this case, a pressure plate 545 formed of a hard material may be further provided on an upper surface of the stamp 540 to apply a uniform pressure to the stamp 540. When the pressure is applied to the stamp 540 as illustrated in FIG. 21, the resin 535 may fill spaces between the grating patterns 541 formed on the stamp 540. In this process, the spaces between the grating patterns 541 of the stamp 540 may be completely filled with the resin 535.

Figure 22:
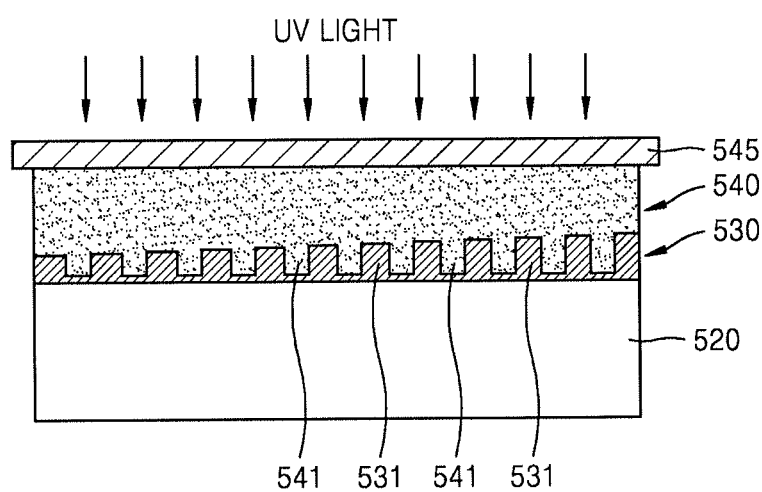
Figure 23:
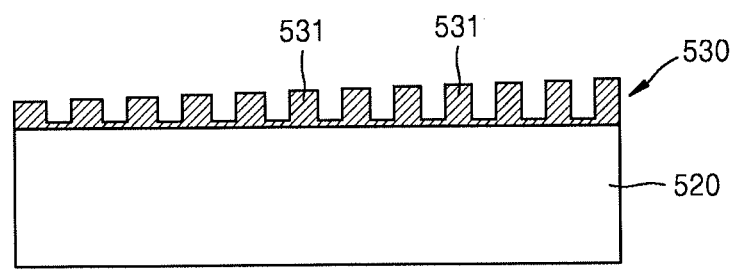

Referring to FIG. 22, in the state of FIG. 21, when light, for example, UV light, is irradiated onto the resin 535 via the pressure plate 545 and the stamp 540, the resin 535 may be cured. Next, when the pressure plate 545 and the stamp 540 are detached from the cured resin 535, a diffraction grating structure 530 including a plurality of diffraction gratings 531 having heights adjusted as illustrated in FIG. 23 may be formed on the upper surface of the light guiding plate 520. FIG. 22 illustrates a case in which the resin 535 is formed of photocurable resin and a diffraction grating structure is formed as the resin 535 is cured by the irradiation of UV light. However, the exemplary embodiments not limited thereto, and according to other exemplary embodiments, the resin 535 may be formed of thermosetting resin and the diffraction grating structure 530 may be formed as the resin 535 is cured by using heat.

As described above, since the spaces between the grating patterns 541 of the stamp 540 are completely filled with the resin 535, the diffraction gratings 531 of the diffraction grating structure 530 may have the same shape as the mold patterns 431 of the master mold 550 of FIG. 17. Accordingly, the heights of the diffraction gratings 531 of the diffraction grating structure 530 may be adjusted depending on location. For example, the heights of the diffraction gratings 531 of the diffraction grating structure 530 may gradually increase as a distance from one side surface of the light guiding plate 520 increases.

As described above, when the substrate 420 and the diffraction grating structure 430 as illustrated in FIG. 14 are used as the master mold 550, the diffraction grating structure 530 including the diffraction gratings 531 having heights that are adjusted depending on location may be repeatedly manufactured on the upper surface of the light guiding plate 520. Furthermore, when the light source is arranged at one or several sides of the light guiding plate 520, the backlight unit for a 3D image display may be manufactured.

According to the above-described exemplary embodiments, since the diffraction gratings of the diffraction grating structure provided on the exit surface of the light guiding plate have the heights that vary depending on location, diffraction efficiency of the diffraction gratings may be finely adjusted depending on location. Accordingly, since the diffracted exit light coming from the diffraction grating structure with directionality may be an exit light having uniform intensity depending on location, uniformity and brightness of the exit light may be secured.

It should be understood that exemplary embodiments described herein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope as defined by the following claims.

What is claimed is:

1. A backlight unit for a three-dimensional (3D) image display, the backlight unit comprising:
a light guiding plate configured to guide light and comprising a light exit surface which emits the light at different positions along the light exit surface and a light incident surface;
a light source configured to emit the light to the light guiding plate; and
a diffraction grating structure provided on the light exit surface and the light incident surface of the light guiding plate, the diffraction grating structure configured to diffract the light emitted from the light exit surface of the light guiding plate, and comprising diffraction gratings having different heights,
wherein the diffraction gratings have different widths from each other, and
wherein a width of each of the diffraction gratings decreases as a distance from the light incident surface of the light guiding plate increases, and
wherein a height of each of the diffraction gratings provided on the light incident surface are equal, and a height of each of the diffraction gratings provided on the light exit surface continuously increases as a distance from the light incident surface of the light guiding plate increases.

2. A three-dimensional (3D) image display device, comprising:
a backlight unit configured to emit diffracted light; and
a display panel configured to modulate the light incident from the backlight unit according to image information,
wherein the backlight unit comprises:
a light guiding plate configured to guide light and comprising a light exit surface which emits the light at different positions along the light exit surface and a light incident surface;
a light source configured to emit the light to the light guiding plate; and
a diffraction grating structure provided on the light exit surface and the light incident surface of the light guiding plate, the diffraction grating structure configured to diffract the light emitted from the light exit surface of the light guiding plate as the diffracted light, and comprising diffracting gratings having different heights,
wherein the diffraction gratings have different widths from each other, and
wherein a width of each of the diffraction gratings decreases from the surface as a distance from the light incident surface of the light guiding plate increases, and
wherein a height of each of the diffraction gratings provided on the light incident surface are equal, and a height of each of the diffraction gratings provided on the light exit surface continuously increases as a distance from the light incident surface of the light guiding plate increases.

3. The 3D image display device of claim 2, wherein the display panel comprises a liquid crystal panel.

4. A backlight unit, comprising:
- a light source configured to emit light;
- a light guiding plate configured to guide the light and comprising a light exit surface which emits the light at different positions along the light exit surface and a light incident surface; and
- a diffraction grating structure provided on the light exit surface and the light incident surface of the light guiding plate and comprising diffracting gratings,
- wherein the light guiding plate is configured to maintain a uniform intensity of the emitted light at the different positions,
- wherein the light incident surface is configured to receive the light emitted from the light source, the light source being arranged to face the light incident surface, and
- wherein a height of each of the diffraction gratings provided on the light incident surface are equal, and a height of each of the diffraction gratings provided on the light exit surface continuously increases as a distance from the light incident surface of the light guiding plate increases.

* * * * *